(12) United States Patent
Tanizaki et al.

(10) Patent No.: US 9,587,953 B2
(45) Date of Patent: Mar. 7, 2017

(54) NAVIGATION DEVICE AND NAVIGATION PROGRAM

(71) Applicant: AISIN AW CO., LTD., Anjo-shi, Aichi-ken (JP)

(72) Inventors: Daisuke Tanizaki, Okazaki (JP); Tomofumi Shibata, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 73 days.

(21) Appl. No.: 14/413,260

(22) PCT Filed: Mar. 8, 2013

(86) PCT No.: PCT/JP2013/056451
§ 371 (c)(1),
(2) Date: Jan. 7, 2015

(87) PCT Pub. No.: WO2014/020930
PCT Pub. Date: Feb. 6, 2014

(65) Prior Publication Data
US 2015/0168171 A1   Jun. 18, 2015

(30) Foreign Application Priority Data

Jul. 30, 2012 (JP) ................................. 2012-168416
Nov. 27, 2012 (JP) ................................. 2012-258619

(51) Int. Cl.
G01C 21/00 (2006.01)
G01C 21/34 (2006.01)

(52) U.S. Cl.
CPC ............................ G01C 21/3461 (2013.01)

(58) Field of Classification Search
CPC .............. G01C 21/343; G01C 21/3461; G01C 21/3446; G01C 21/3492
(Continued)

(56) References Cited

U.S. PATENT DOCUMENTS

2004/0088106 A1* 5/2004 Omi ................... G01C 21/3461
701/533
2007/0061071 A1* 3/2007 Torii .................. G01C 21/3641
701/533
(Continued)

FOREIGN PATENT DOCUMENTS

| JP | A 2002-243477 | 8/2002 |
| JP | A 2002-323335 | 11/2002 |
| JP | A 2007-078530 | 3/2007 |

OTHER PUBLICATIONS

International Search Report for PCT/JP2013/056451 issued Jun. 11, 2013.

*Primary Examiner* — Redhwan K Mawari
(74) *Attorney, Agent, or Firm* — Oliff PLC

(57) ABSTRACT

Navigation devices, methods, and programs acquire a departure point and a destination, accept a designation of a passing area, and determine a departure-point-side border point on a departure point side and a destination-side border point on a destination side in the designated passing area. The devices, methods, and programs calculate, as a travel route from the departure point to the destination through the passing area: (i) a departure-point-side travel route from the departure point to the departure-point-side border point; (ii) a passing area travel route from the departure-point-side border point to the destination-side border point; and (iii) a destination-side travel route from the destination-side border point to the destination.

6 Claims, 11 Drawing Sheets

(58) Field of Classification Search
USPC .......................................................... 426/343
See application file for complete search history.

(56) References Cited

U.S. PATENT DOCUMENTS

| | | | | |
|---|---|---|---|---|
| 2010/0114472 A1* | 5/2010 | Oumi | ................. | G01C 21/3476 |
| | | | | 701/532 |
| 2010/0306245 A1* | 12/2010 | Kuwabara | .......... | G01C 21/3664 |
| | | | | 707/769 |
| 2011/0113155 A1* | 5/2011 | Kuznetsov | ......... | G01C 21/3492 |
| | | | | 709/241 |
| 2012/0072107 A1* | 3/2012 | Okude | ................. | G01C 21/343 |
| | | | | 701/416 |
| 2015/0168171 A1* | 6/2015 | Tanizaki | ............ | G01C 21/3461 |
| | | | | 701/426 |

* cited by examiner

FIG. 4A    FIG. 4B
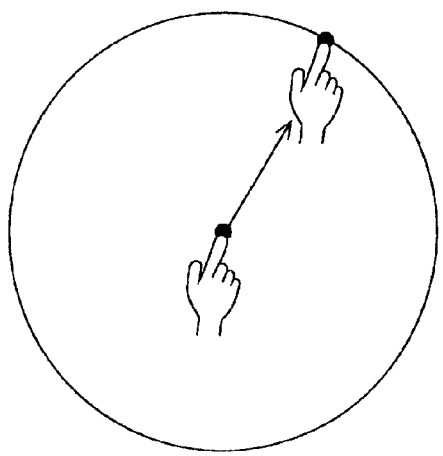
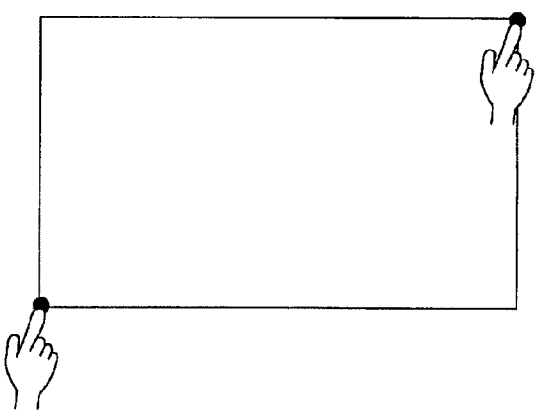
FIG. 4C
VIEWING AREA DESIGNATION MAP
| No | VIEWING ITEM | AREA | | | |
|---|---|---|---|---|---|
| 0 1 | CHERRY | $(x_{11}, y_{11})$ | $(x_{12}, y_{12})$ | $(x_{13}, y_{13})$ | $(x_{14}, y_{14})$ |
| 0 2 | PLUM | $(x_{20}, y_{20})$ | $(x_{21}, y_{21})$ | $(x_{22}, y_{22})$ | $(x_{23}, y_{23})$ |
| 0 3 | TEMPLE | $(x_{31}, y_{31})$ | $(x_{32}, y_{32})$ | $(x_{33}, y_{33})$ | |
| 0 4 | OLD TOWN AROUND CASTLE | ⋮ | | | |
| 0 5 | ⋮ | ⋮ | | | |
| ⋮ | ⋮ | ⋮ | | | |

FIG. 5

| No | DEPARTURE POINT | DEPARTURE POINT SIDE TRAVEL ROUTE COST | DEPARTURE POINT SIDE BORDER POINT | PASSING AREA TRAVEL ROUTE COST | DESTINATION SIDE BORDER POINT | DESTINATION SIDE TRAVEL ROUTE COST | DESTI-NATION | TOTAL TRAVEL ROUTE COST |
|---|---|---|---|---|---|---|---|---|
| 1 | S | 300 | s1 | 250 | g1 | 400 | G | 950 |
| 2 | S | 300 | s1 | 300 | g2 | 300 | G | 900 |
| 3 | S | 300 | s1 | 280 | g3 | 300 | G | 880 |
| 4 | S | 300 | s1 | 450 | g4 | 350 | G | 1100 |
| 5 | S | 350 | s2 | 300 | g1 | 400 | G | 1050 |
| 6 | S | 350 | s2 | 400 | g2 | 300 | G | 1050 |
| 7 | S | 350 | s2 | 380 | g3 | 300 | G | 1030 |
| 8 | S | 350 | s2 | 300 | g4 | 350 | G | 1000 |
| 9 | S | 400 | s3 | 300 | g1 | 400 | G | 1100 |
| 10 | S | 400 | s3 | 350 | g2 | 300 | G | 1050 |
| 11 | S | 400 | s3 | 330 | g3 | 300 | G | 1030 |
| 12 | S | 400 | s3 | 300 | g4 | 350 | G | 1050 |

FIG. 7

| No | DEPARTURE POINT | DEPARTURE POINT SIDE TRAVEL ROUTE COST | DEPARTURE POINT SIDE BORDER POINT | PASSING AREA TRAVEL ROUTE COST | DESTINATION SIDE BORDER POINT | DESTINATION SIDE TRAVEL ROUTE COST | DESTI-NATION | TOTAL TRAVEL ROUTE COST | RANK-ING |
|---|---|---|---|---|---|---|---|---|---|
| 1 | S | 450 | s 1 | 300 | g 1 | 850 | G | 1600 | 1 |
| 2 | S | 400 | s 2 | 600 | g 2 | 800 | G | 1800 | 2 |
| 3 | S | 400 | s 2 | 750 | g 3 | 700 | G | 1850 | 4 |
| 4 | S | 400 | s 2 | 750 | g 4 | 690 | G | 1840 | 3 |
| 5 | S | 400 | s 2 | 1250 | g 5 | 800 | G | 2450 | 9 |
| 6 | S | 420 | s 3 | 800 | g 2 | 800 | G | 2020 | 5 |
| 7 | S | 420 | s 3 | 950 | g 3 | 700 | G | 2070 | 7 |
| 8 | S | 420 | s 3 | 950 | g 4 | 690 | G | 2060 | 6 |
| 9 | S | 420 | s 3 | 900 | g 5 | 800 | G | 2120 | 8 |

| No | ROAD | ROAD COST | DISTANCE FROM CENTER | NEW ROAD COST |
|---|---|---|---|---|
| 1 | R 1 | 300 | 400 | 240 |
| 2 | R 2 | 400 | 150 | 120 |
| 3 | R 3 | 300 | 150 | 90 |
| 4 | R 4 | 300 | 150 | 90 |
| 5 | R 5 | 300 | 30 | 18 |
| 6 | R 6 | 250 | 100 | 50 |
| 7 | R 7 | 300 | 150 | 90 |
| 8 | R 8 | 350 | 150 | 105 |
| 9 | R 9 | 300 | 140 | 84 |
| 10 | R 10 | 200 | 150 | 60 |
| 11 | R 11 | 200 | 150 | 60 |
| 12 | R 12 | 150 | 250 | 75 |
| 13 | R 13 | 150 | 250 | 75 |

FIG. 9A

| No | DEPARTURE POINT | DEPARTURE POINT SIDE TRAVEL ROUTE COST | DEPARTURE POINT SIDE BORDER POINT | PASSING AREA TRAVEL ROUTE COST | DESTINATION SIDE BORDER POINT | DESTINATION SIDE TRAVEL ROUTE COST | DESTINATION | TOTAL TRAVEL ROUTE COST | RANKING |
|---|---|---|---|---|---|---|---|---|---|
| 1 | S | 450 | s 1 | 300 | g 1 | 850 | G | 1600 | 1 |
| 2 | S | 400 | s 2 | 600 | g 2 | 800 | G | 1800 | 2 |
| 3 | S | 400 | s 2 | 750 | g 3 | 700 | G | 1850 | 4 |
| 4 | S | 400 | s 2 | 750 | g 4 | 690 | G | 1840 | 3 |
| 5 | S | 400 | s 2 | 1250 | g 5 | 800 | G | 2450 | 9 |
| 6 | S | 420 | s 3 | 800 | g 2 | 800 | G | 2020 | 5 |
| 7 | S | 420 | s 3 | 950 | g 3 | 700 | G | 2070 | 7 |
| 8 | S | 420 | s 3 | 950 | g 4 | 690 | G | 2060 | 6 |
| 9 | S | 420 | s 3 | 900 | g 5 | 800 | G | 2120 | 8 |

FIG. 9B

| No | DEPARTURE POINT | DEPARTURE POINT SIDE TRAVEL ROUTE COST | DEPARTURE POINT SIDE BORDER POINT | PASSING AREA TRAVEL ROUTE COST | DESTINATION SIDE BORDER POINT | DESTINATION SIDE TRAVEL ROUTE COST | DESTINATION | TOTAL TRAVEL ROUTE COST | RANKING |
|---|---|---|---|---|---|---|---|---|---|
| 1 | S | 450 | s 1 | 240 | g 1 | 850 | G | 1540 | 8 |
| 2 | S | 400 | s 2 | 180 | g 2 | 800 | G | 1380 | 5 |
| 3 | S | 400 | s 2 | 255 | g 3 | 700 | G | 1355 | 3 |
| 4 | S | 400 | s 2 | 255 | g 4 | 690 | G | 1345 | 1 |
| 5 | S | 400 | s 2 | 369 | g 5 | 800 | G | 1569 | 9 |
| 6 | S | 420 | s 3 | 168 | g 2 | 800 | G | 1388 | 6 |
| 7 | S | 420 | s 3 | 243 | g 3 | 700 | G | 1363 | 4 |
| 8 | S | 420 | s 3 | 243 | g 4 | 690 | G | 1353 | 2 |
| 9 | S | 420 | s 3 | 245 | g 5 | 800 | G | 1465 | 7 |

FIG. 10

| No | DEPARTURE POINT SIDE BORDER POINT | PASSING AREA TRAVEL ROUTE COST | DESTINATION SIDE BORDER POINT | PASSING AREA TRAVEL ROUTE DISTANCE | TOTAL DISTANCE | NEW COST |
|---|---|---|---|---|---|---|
| 1 | s 1 | 300 | g 1 | 300 | 1600 | 244 |
| 2 | s 2 | 600 | g 2 | 600 | 1800 | 400 |
| 3 | s 2 | 750 | g 3 | 750 | 1850 | 446 |
| 4 | s 2 | 750 | g 4 | 750 | 1840 | 445 |
| 5 | s 2 | 1250 | g 5 | 1250 | 2450 | 613 |
| 6 | s 3 | 800 | g 2 | 800 | 2020 | 484 |
| 7 | s 3 | 950 | g 3 | 950 | 2070 | 515 |
| 8 | s 3 | 950 | g 4 | 950 | 2060 | 512 |
| 9 | s 3 | 900 | g 5 | 900 | 2120 | 518 |

FIG. 11A

| No | DEPARTURE POINT | DEPARTURE POINT SIDE TRAVEL ROUTE COST | DEPARTURE POINT SIDE BORDER POINT | PASSING AREA TRAVEL ROUTE COST | DESTINATION SIDE BORDER POINT | DESTINATION SIDE TRAVEL ROUTE COST | DESTINATION | TOTAL TRAVEL ROUTE COST | RANKING |
|---|---|---|---|---|---|---|---|---|---|
| 1 | S | 450 | s 1 | 300 | g 1 | 850 | G | 1600 | 1 |
| 2 | S | 400 | s 2 | 600 | g 2 | 800 | G | 1800 | 2 |
| 3 | S | 400 | s 2 | 750 | g 3 | 700 | G | 1850 | 4 |
| 4 | S | 400 | s 2 | 750 | g 4 | 690 | G | 1840 | 3 |
| 5 | S | 400 | s 2 | 1250 | g 5 | 800 | G | 2450 | 9 |
| 6 | S | 420 | s 3 | 800 | g 2 | 800 | G | 2020 | 5 |
| 7 | S | 420 | s 3 | 950 | g 3 | 700 | G | 2070 | 7 |
| 8 | S | 420 | s 3 | 950 | g 4 | 690 | G | 2060 | 6 |
| 9 | S | 420 | s 3 | 900 | g 5 | 800 | G | 2120 | 8 |

FIG. 11B

| No | DEPARTURE POINT | DEPARTURE POINT SIDE TRAVEL ROUTE COST | DEPARTURE POINT SIDE BORDER POINT | PASSING AREA TRAVEL ROUTE COST | DESTINATION SIDE BORDER POINT | DESTINATION SIDE TRAVEL ROUTE COST | DESTINATION | TOTAL TRAVEL ROUTE COST | RANKING |
|---|---|---|---|---|---|---|---|---|---|
| 1 | S | 450 | s 1 | 244 | g 1 | 850 | G | 1544 | 2 |
| 2 | S | 400 | s 2 | 400 | g 2 | 800 | G | 1600 | 4 |
| 3 | S | 400 | s 2 | 446 | g 3 | 700 | G | 1546 | 3 |
| 4 | S | 400 | s 2 | 445 | g 4 | 690 | G | 1535 | 1 |
| 5 | S | 400 | s 2 | 613 | g 5 | 800 | G | 1813 | 9 |
| 6 | S | 420 | s 3 | 484 | g 2 | 800 | G | 1704 | 7 |
| 7 | S | 420 | s 3 | 515 | g 3 | 700 | G | 1635 | 6 |
| 8 | S | 420 | s 3 | 512 | g 4 | 690 | G | 1622 | 5 |
| 9 | S | 420 | s 3 | 518 | g 5 | 800 | G | 1738 | 8 |

NAVIGATION DEVICE AND NAVIGATION PROGRAM

TECHNICAL FIELD

Related technical fields include navigation devices and navigation programs, for example, that calculate a route to a destination.

BACKGROUND ART

Navigation devices that calculate a travel route to a destination using a point inputted by a user or a current position of a vehicle as a departure point, provide guidance on the calculated travel route, and supply the travel route to another terminal device are widely prevalent. In a case in which the calculated travel route is supplied to another terminal device, the terminal device that has received the travel route provides guidance on the travel route.

After a destination is set and route calculation is performed on the navigation devices, in a case in which the calculated route does not include an area that the user desires to pass through, it has been necessary for the user to designate a way point or a passing road to cause the navigation devices to perform route calculation again.

However, some users may not have specific ideas regarding the points and/or the roads that they desire to pass through. For example, in a case in which a user desires to see cherry blossoms on the way to the destination, the user has been required to designate a specific point, which is a bothersome operation for the user.

Patent Document 1 proposes a technique to calculate a guidance route that passes through a specific point defined by the user or a predetermined area including the specific point.

RELATED ART DOCUMENT

Patent Document 1: Japanese Patent Application Publication No. 2007-078530 (JP 2007-078530 A)

SUMMARY

However, also in the technique disclosed in Patent Document 1, it is necessary to define the specific point, which is a bothersome operation for the user.

In addition, regarding the guidance route that passes through the predetermined area including the defined specific point, the specific calculation method, such as how to determine the route, how to determine a point (road) to enter the predetermined area and a point to exit from the predetermined area, etc., is not specifically disclosed.

It is generally supposed to calculate all possible routes by setting all of the points through which the predetermined area can be entered as departure points and all of the points (the same as all the entering points) through which the predetermined area can be exited as destinations and set a most appropriate route among the calculated routes as a travel route in the predetermined area.

However, in a case in which all possible routes are calculated as the routes passing through the predetermined area, the required volume of processing becomes huge. Thereby, the calculation time or the processing load may increase.

Exemplary embodiments provide a technology by which a user is able to designate a rough area that the user desires to pass through by a simple operation and a travel route passing through the designated area is calculated with low processing load.

Exemplary embodiments of the broad inventive principles described herein provide a navigation device characterized by comprising: a point acquisition means for acquiring a departure point and a destination; a passing area designation means for accepting a designation of a passing area; a determination means for determining a departure-point-side border point on a departure point side and a destination-side border point on a destination side in the designated passing area; and a route calculation means for calculating, as a travel route from the departure point to the destination through the passing area, a departure-point-side travel route from the departure point to the departure-point-side border point, a passing area travel route from the departure-point-side border point to the destination-side border point, and a destination-side travel route from the destination-side border point to the destination.

Exemplary embodiments provide the navigation device according to claim 1, characterized in that the determination means, in a case in which two tangent lines are drawn from the acquired departure point toward the passing area, determines the departure-point-side border point on a border of the passing area on the departure point side, which is placed between the two tangent lines, and in a case in which two tangent lines are drawn from the acquired destination toward the passing area, determines the destination-side border point on a border of the passing area on the destination side, which is placed between the two tangent lines.

Exemplary embodiments provide that the determination means determines a plurality of departure-point-side border points and destination-side border points in accordance with roads passing through the passing area; and the route calculation means: obtains each departure point travel route cost from the departure point to each departure-point-side border point, each passing area travel route cost from each departure-point-side border point to each destination-side border point, and each destination-side travel route cost from each destination-side border point to the destination; and sets, as a travel route, a combination in which a total cost becomes the smallest among combinations of a departure point travel route, a passing area travel route, and a destination-side travel route.

Exemplary embodiments provide a cost correction means for correcting a road cost of each road in the passing area by multiplying a smaller coefficient as a distance from a center of the designated passing area to the road decreases, wherein the route calculation means obtains the each passing area travel route cost using the road costs corrected by the cost correction means.

Exemplary embodiments provide that the distance from the center to the road is any one of a shortest distance to the road, an average value between a distance to a start point and a distance to an end point of the road, a distance to a center point of the road, the distance to the start point or the distance to the end point of the road whichever is shorter, and a shortest distance with respect to respective links forming the road.

Exemplary embodiments provide a cost correction means for correcting a passing area travel route cost of each passing area travel route by multiplying a smaller coefficient as a travel distance of the passing area travel route from the departure-point-side border point to the destination-side border point increases, wherein the route calculation means obtains the each passing area travel route cost using the passing area travel route cost corrected by the cost correction means.

Exemplary embodiments provide that the cost correction means corrects the each passing area travel route cost by multiplying a smaller coefficient as a value of the travel distance of the passing area travel route in relation to a total travel distance of the travel route from the departure point to the destination through the passing area increases.

Exemplary embodiments provide a threshold value acquisition means for acquiring a threshold value for a distance or a time for traveling the passing area, wherein the route calculation means excludes a passing area travel route whose travel distance or travel time is equal to or less than the threshold value among the each passing area travel route from the each departure-point-side border point to the each destination-side border point.

Exemplary embodiments provide a navigation program causing a computer to realize: a point acquisition function that acquires a departure point and a destination; a passing area designation function that accepts a designation of a passing area; a determination function that determines a departure-point-side border point on a departure point side and a destination-side border point on a destination side in the designated passing area; and a route calculation function that calculates, as a travel route from the departure point to the destination through the passing area, a departure-point-side travel route from the departure point to the departure-point-side border point, a passing area travel route from the departure-point-side border point to the destination-side border point, and a destination-side travel route from the destination-side border point to the destination.

According to exemplary embodiments, the departure-point-side border point on the departure point side and the destination-side border point on the destination side in the designated passing area are determined and a travel route passing through these points from the departure point to the destination is calculated. Therefore, calculation with low processing load becomes possible.

In addition, it is only necessary for the user to designate a passing area as rough information without designating a specific point or road that the user desires to pass through. Therefore, the operation for designation becomes simple.

BRIEF DESCRIPTION OF THE DRAWINGS

FIG. 4 illustrates various kinds of designation methods of a passing area A by a user.

FIG. 5 illustrates travel route costs stored in a RAM.

FIG. 7 illustrates a value of a travel route cost of each travel route passing through a passing area A.

FIG. 9 illustrates a case in which new road costs according to the second embodiment are reflected.

FIG. 10 is a table showing a passing area travel route cost after correction for each passing area travel route passing through a passing area A according to a third embodiment.

FIG. 11 illustrates a case in which the passing area travel route costs after correction are reflected.

EXEMPLARY EMBODIMENTS

Hereinafter, a navigation device will be described in detail on the basis of preferred embodiments with reference to FIGS. 1 to 11.

(1) Summary of Embodiments

In the navigation device according to the present embodiment, regarding a place that a user desires to pass through, the user can designate only an area instead of designating a specific point or road to cause the navigation device to perform route calculation for a route passing through the area.

Figure 1:
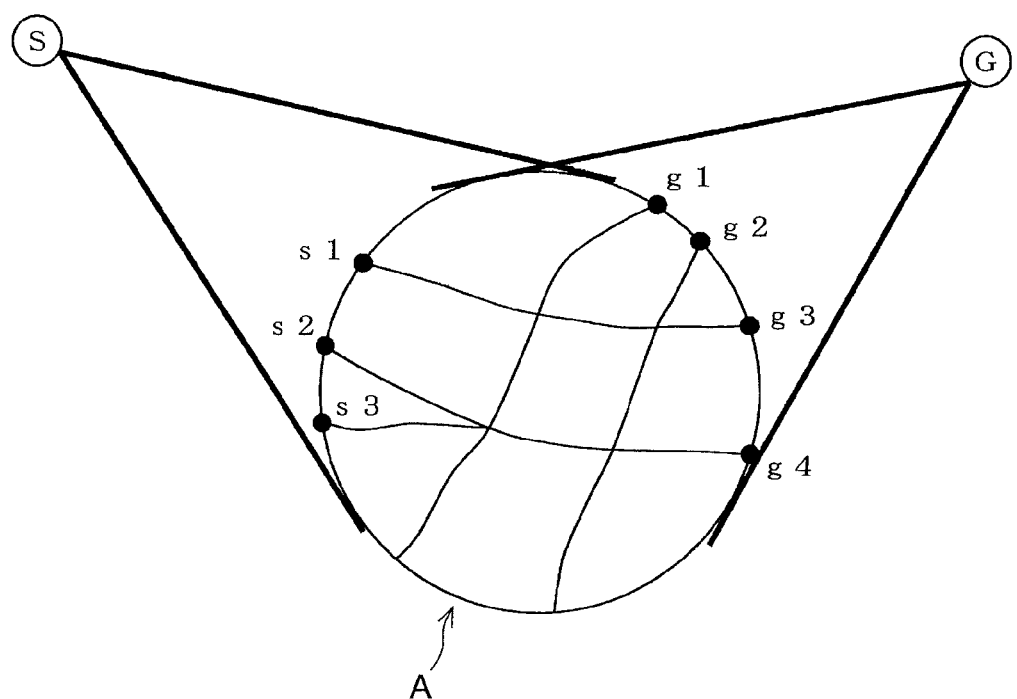
FIG. 1 illustrates a calculation method of a travel route passing through an area.

FIG. 1 illustrates a calculation method of a travel route passing through an area.

As shown in FIG. 1, the user designates a departure point S and a destination G and also, designates a passing area A on a map displayed on a screen. When two points are designated on the screen, a circular area having a radius formed by the designated two points is designated as the passing area A. In addition, a circular area having a diameter formed by the two points or a rectangular area having a diagonal formed by the two points may be designated as the passing area A. Also, the passing area may be designated by specifying an area name of a previously determined area (for example, an area where cherry blossom viewing area is defined).

If the route calculation is performed with respect to all the patterns in which the destination G is reached from the departure point S through the designated passing area A, the processing volume in the navigation device becomes huge. For example, as shown in FIG. 1, in a case in which there are nine border points at which the border of the passing area A intersects with roads, it is necessary to perform route calculation a total of 99 times with respect to 9 routes from the departure point S to the border points, 81 routes from the 9 border points, at which the passing area A is entered, to the 9 border points, at which the passing area A is exited, and 9 routes from the 9 border points to the destination G.

In the present embodiment, as shown in FIG. 1, departure-point-side border points s1 to s3 and destination-side border points g1 to g4 are determined from all of the border points of the designated passing area A, and the route calculation is performed a total of 19 times with respect to 3 routes (departure-point-side travel route) from the departure point S to the respective departure-point-side border points s1 to s3, 12 routes (passing area travel route) from the respective departure-point-side border points s1 to s3 to the respective destination-side border points g1 to g4, 4 routes (destination-side travel route) from the respective destination-side border points g1 to g4 to the destination G, thereby it is possible to efficiently perform the route calculation.

In the navigation device, a combination in which the total cost is the smallest among combinations of the 3 departure-point-side travel routes, the 12 passing area travel routes, and the 4 destination-side travel routes is set as a travel route from the departure point S to the destination G through the passing area A.

The departure-point-side border points s1 to s3 and the destination-side border points g1 to g4 are determined as follows.

As shown in FIG. 1, two tangent lines are drawn from the set departure point S toward the passing area A, and the border points on the border line of the passing area A on the departure point S side, which are placed between the two tangent lines, are determined as the departure-point-side border points s1 to s3.

In the same manner, the border points on the border line of the passing area A on the destination G side, which are placed between two tangent lines drawn from the set destination G toward the passing area A, are determined as the destination-side border points g1 to g4.

(2) Details of Embodiments

Figure 2:
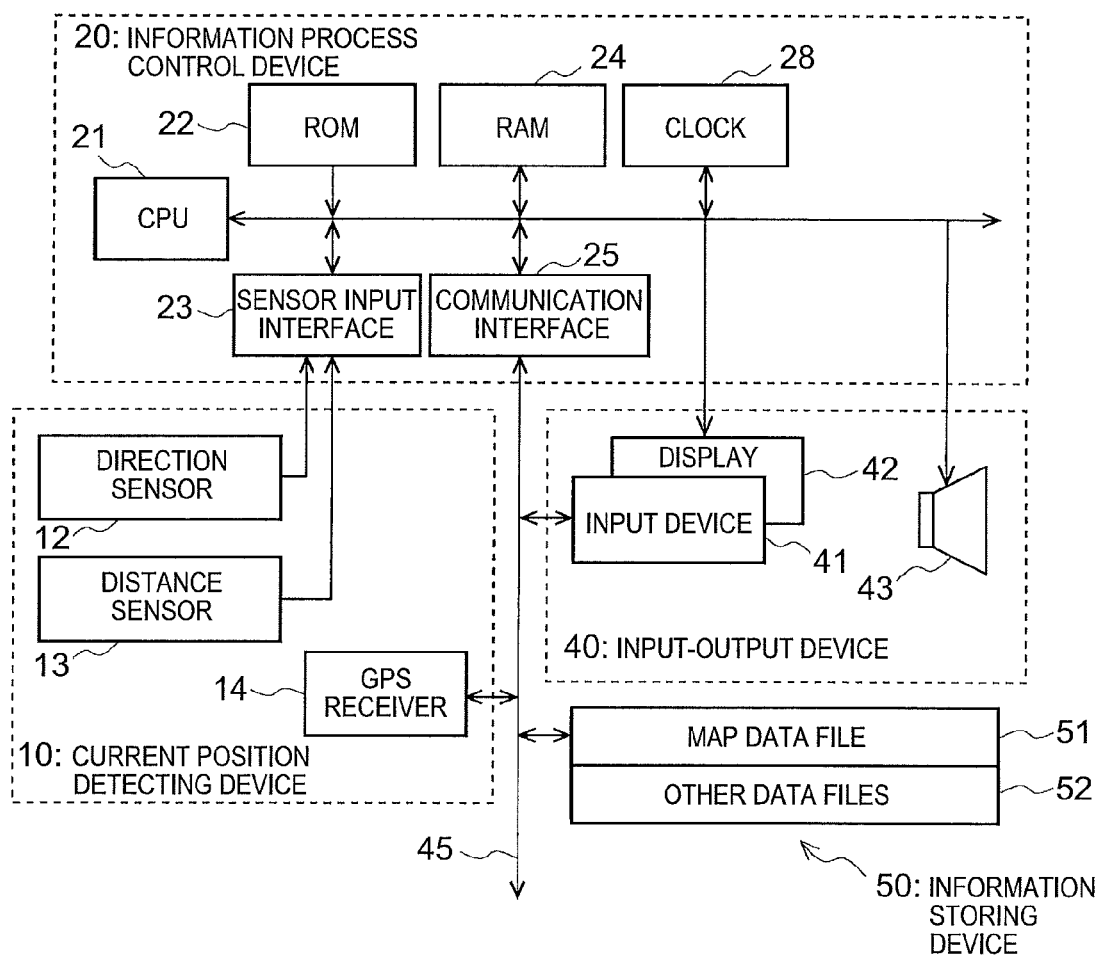
FIG. 2 is a block diagram that shows a navigation device.

FIG. 2 is a block diagram of a navigation device to which the present embodiment is applied.

The navigation device is provided with a current position detecting device 10, an information process control device 20, an input-output device 40, and an information storing device 50, as shown in FIG. 2.

The current position detecting device 10 is provided with a direction sensor 12, a distance sensor 13, and a GPS receiver 14, each of which is configured as follows.

The direction sensor 12 is a means for detecting an angle relatively shifted with respect to a reference angle (an absolute direction), and utilizes a gyro sensor that detects a change in angle using angular velocity. In addition, the direction sensor 12 may be an optical rotation sensor or a rotary resistor volume that is attached to a rotating part of a steering wheel or an angular sensor that is attached to a wheel. Also, the direction sensor 12 may be a means for detecting an absolute direction, for example, a geomagnetic sensor that detects a direction at which a vehicle is located by detecting N direction based on a magnet.

The distance sensor 13 is a means for measuring a movement distance of a vehicle, and utilizes, for example, a unit that detects and counts rotation of wheels or a unit that detects and integrates acceleration two times.

The GPS (global positioning system) receiver 14 is a device that receives signals from artificial satellites and is capable of obtaining various information such as transmitting time of signals, positional information of the receiver, the movement speed of the receiver, the travel direction of the receiver, and the like.

The information process control device 20 is a means for performing computing and control based on information input from the current position detecting device 10 and the input-output device 40 and information stored in the information storing device 50 as well as controlling such that the computing result is output to an output means, such as a display 42, a speaker 43, etc.

The information process control device 20 is configured as follows.

A central processing unit (CPU) 21 performs general computing and control for the entire navigation device.

A ROM 22 stores programs regarding calculation of a route to a destination and navigation such as display guidance, audio guidance, etc., and various kinds of programs such as a passing area designation calculation process program according to the present embodiment, etc.

A sensor input interface 23 is a means for receiving information from the current position detecting device 10.

A RAM 24 is a storage means for storing information of a destination inputted on an input device 41 and information such as passing point information inputted by a user, and also storing results of computing by the CPU 21 based on the input information of the user, results of route calculation, or map information read from the information storing device 50.

For example, the RAM 24 stores an input departure point S, a destination G, a passing area A, departure-point-side border points s and destination-side border points g located on the border of the passing area A, costs of travel routes calculated for sections between the respective points S, s, g, and G, total travel route costs with respect to the calculated respective travel routes from the departure point S to the destination G through the passing area A, etc.

A communication interface 25 is a means for inputting or outputting various kinds of information through a transmission path 45. Specifically, the communication interface 25 is connected to the GPS receiver 14, the input device 41, and the information storing device 50 through the transmission path 45.

A clock 28 is configured, for example, using a crystal oscillator. The clock 28 counts time and provides operation timings for each part of the navigation device by oscillation.

In addition, an image processor that processes vector information processed by the CPU 21 into image information, an image memory that stores the image information processed by the image processor, an audio processor that processes audio information read out from the information storing device 50 and outputs to the speaker 43 are provided.

The input-output device 40 includes the input device 41 for inputting data such as a destination, a passing point, a calculation condition, etc., by a user, the display 42 that displays an image, and the speaker 43 that outputs audio.

The input device 41 includes, for example, a touch panel, a touch switch, a joy stick, a key stick, etc. On the input device 41, a departure point S and a destination G are inputted and a passing area A is designated by a user operation.

A map of the vicinity of a current position and a travel route to a destination are displayed on the display 42.

The information storing device 50 is connected to the information process control device 20 through the transmission path 45.

The information storing device 50 stores a map data file 51 and other data files 52 (for example, audio data to provide travel route guidance by audio, etc.).

The information storing device 50 is generally configured by a DVD-ROM that is an optical storage media, a hard disk that is a CD-ROM or a magnetic storage media, and the like. However, the information storing device 50 may be configured by various kinds of information media such as a magnetic optical disk, various semiconductor memories, etc.

For information that is required to be rewritten, a rewritable hard disk, a flash memory, and the like may be utilized. For other fixed information, a ROM such as a CD-ROM, a DVD-ROM, etc., may be utilized.

The map data file 51 stores, as various kinds of data necessary for map display, route calculation, and route guidance for navigation, map data, road data, viewing area designation map, destination data, guidance point data, detailed destination data, and other data.

The map data includes nationwide road map, road map or residential map of each region, etc. The road map includes various roads such as main arterial roads, highways, and narrow streets, and aboveground landmarks (facilities, etc.). The residential map is a city map on which graphics representing outer shapes of aboveground structures, road names, etc. are displayed. The narrow street includes relatively-narrow streets that are, for example, smaller than national roads and preferectural roads and whose road widths are equal to or less than a predetermined value.

With the map data, a map of a certain area at a specified scale, including the current position of the vehicle and the points designated by the user, is displayed on the display 42. The current position of the vehicle and the designated points are displayed on the map.

The road data is data regarding roads including a position, a type, and a number of lanes of each road, and connection relation between roads, and includes node information and link information. The road data is utilized for route calculation and map matching and also utilized to display the calculated travel route over the map data.

The viewing area designation map is data prepared for "viewing areas" that are designable by the user as passing areas A.

The viewing area designation map defines various kinds of viewing areas where certain nature, building structures, etc. can be viewed while traveling around the areas by vehicle, such as nature areas where nature such as cherry, plum, sweet flag, etc. can be viewed, building structure areas where building structures such as temples, old town around a castle, etc., can be viewed.

The viewing area designation map stores "names" for viewing areas that are displayed on a screen when the user designates a viewing area, together with coordinate values defining the borders of the viewing areas.

To designate a viewing area as a passing area A, the user may perform search by sequentially narrowing by region and/or by category. Alternatively, the user may select one of extracted and displayed "viewing areas" that are located within a predetermined distance N km from a direct line connecting from the input departure point S to the destination G.

Subsequently, the operation of the passing area designation calculation process executed by the navigation device configured as above is explained.

Figure 3:
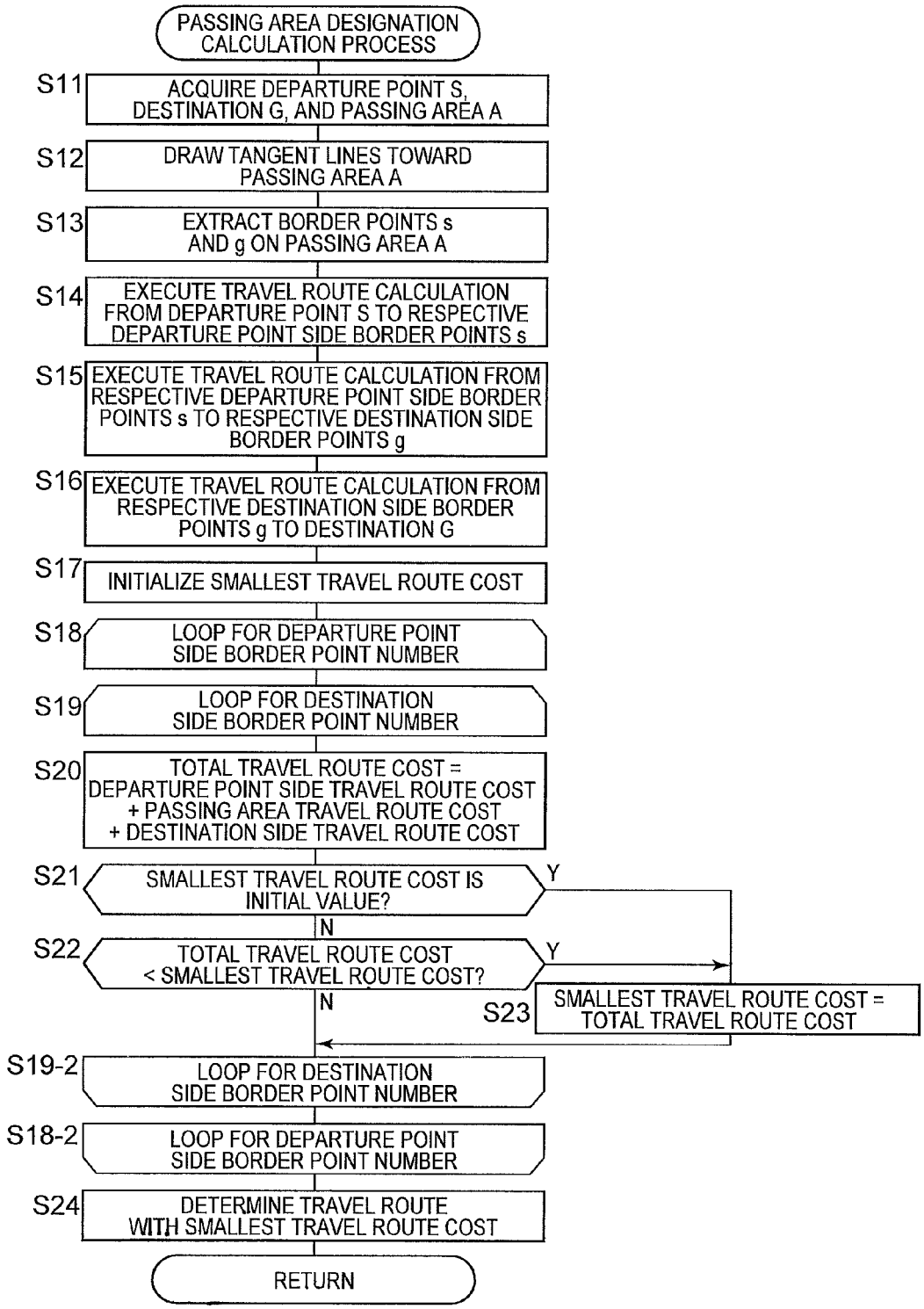
FIG. 3 is a flowchart showing contents of passing area designation calculation process.

FIG. 3 is a flowchart showing contents of the passing area designation calculation process.

The CPU 21 of the navigation device acquires a departure point S, a destination G, and a passing area A (Step 11).

The CPU 21 acquires the departure point S and the destination G inputted by the user on the input device 41. Note that, in a case in which a current position is designated though a user input, or in a case in which a departure point S is not inputted, the CPU 21 acquires the current position of the vehicle detected by the current position detecting device 10 as the departure point S.

On the other hand, the CPU 21 acquires, as a passing area A, an area designated by the user from the map displayed on the display 42 or the viewing area designation map.

FIG. 4 illustrates various kinds of designation methods of a passing area A by the user.

In the present embodiment, the method shown in FIG. 4A is exemplified. However, the method shown in FIG. 4B or FIG. 4C may be utilized. Alternatively, the user may select a designation method from two out of the three methods, from the three methods, or from methods including other methods in addition to the two or three methods, and designate a passing area A.

In the designation method of a passing area A shown in FIG. 4A, the user designates two points on the screen of the input device 41 with a finger, and the CPU 21 acquires, as the passing area A, a circular area that is centered at the firstly designated point and passes the secondly designated point.

In the above method, a circular area having a radius formed by the user's designated two points is designated as the passing area A. However, a circular area that passes the user's designated two points with a diameter formed by the two points may be designated as the passing area A. Alternatively, an ellipse having the foci formed by the designated two points may be acquired as the passing area A.

In the designation method of the passing area A shown in FIG. 4B, the CPU 21 acquires a rectangular area having a diagonal formed by the user's designated two points as the passing area A.

In addition, the user may designate three or more points and the CPU 21 may acquire an area made by connecting the designated points in the order of designation as the passing area A. Alternatively, instead of designating a plurality of points, the user may make a closed area by designating a point and moving it on the screen, and the CPU 21 may acquire the closed area as the passing area A.

In the designation method of the passing area A shown in FIG. 4C, when the user selects a viewing area designation on the input device 41, the CPU 21 narrows the data by category and/or by level that is selected by the user and displays names of viewing areas on a list on the screen.

The CPU 21 acquires a passing area A by reading, from the map data file 51, area data corresponding to the viewing area that was finally selected by the user from the displayed viewing area list.

Referring to FIG. 3, the CPU 21 draws tangent lines toward the passing area A (Step 12).

Specifically, as shown in FIG. 1, the CPU 21 draws two tangent lines from both the departure point S and the destination G so as to sandwich the passing area A.

The tangent lines may be virtual tangent lines, and points (a total of four tangent points) at which two direct lines passing through the departure point S and two direct lines passing through the destination G contact with the passing area A may be acquired.

In either case, the process is internally performed and the virtual tangent lines and the tangent points are not displayed on the display 42.

The CPU 21 extracts border points s and g on the passing area A (Step 13).

Specifically, the CPU 21, as shown in FIG. 1, extracts, from all of the border points on the designated passing area A, departure-point-side border points s (s1 to s3 in the example shown in FIG. 1) on the departure point S side that are placed between the two tangent lines passing through the departure point S and destination-side border points g (g1 to g4 in the example shown in FIG. 1) on the destination G side that are placed between the two tangent lines passing through the destination G.

The CPU 21 executes travel route calculation for routes from the departure point S to the respective departure-point-side border points s (Step 14).

Specifically, in the example shown in FIG. 1, the CPU 21 executes travel route calculation from the departure point S to the respective tentative destinations of three points of the departure-point-side border points s1 to s3, and stores 3 departure-point-side travel routes from the departure point S to the departure-point-side border points s1 to s3 and the respective departure-point-side travel route costs in the RAM 24.

The CPU 21 executes travel route calculation for routes from the respective departure-point-side border points s to the respective destination-side border points g (Step 15).

Specifically, in the example shown in FIG. 1, the CPU 21 executes travel route calculation using the 3 points of the departure-point-side border points s1 to s3 as tentative departure points and the respective destination-side border points g1 to g4 as tentative destinations and stores 12 passing area travel routes and the respective passing area travel route costs in the RAM 24.

The CPU 21 executes travel route calculation for routes from the respective destination-side border points g to the destination G (Step 16).

Specifically, in the example shown in FIG. 1, the CPU 21 executes travel route calculation to the destination G using the 4 points of the destination-side border points g1 to g4 as tentative departure points, and stores 4 destination-side travel routes and the respective destination-side travel route costs in the RAM 24.

The travel route calculation of the aforementioned Step 14 to 16 may be executed in any order, or may be executed in parallel.

Subsequently, the CPU 21 initializes a smallest travel route cost (Step 17).

The CPU 21 executes the process from Step 20 to Step 23 for a loop for a departure-point-side border point number by Step 18 to Step 18-2 and a loop for a destination-side border point number by Step 19 to Step 19-2.

Using the travel route costs calculated with respect to sections between the departure point S, the departure-point-side border points s1 to s3, the destination-side border points g1 to g4, and the destination G, a smallest value of a total travel route cost for the travel route from the departure point S to the destination G through the passing area A is acquired.

FIG. 5 illustrates the travel route costs stored in the RAM 24.

As shown in FIG. 5, No. 1 to No. 12 indicate travel routes from the departure point S to the destination G through the passing area A, the travel route costs of the sections between the respective points, and the total travel route costs that are total values of the travel route costs. The departure-point-side border points s1 to s3 and the destination-side border points g1 to g4 for the passing area A correspond to the example shown in FIG. 1.

As shown in FIG. 5, the departure-point-side border point s1 is selected at the beginning of the loop of Step 18 to Step 18-2; thereafter, with respect to s1, the destination-side border point g1 is selected from the destination-side border point g1 to g4 at the beginning of Step 19 to Step 19-2. Thereby, a travel route 1 of the departure point S—the departure-point-side border point s1—the destination-side border point g1—the destination G is selected.

The CPU 21 calculates, with respect to the travel route selected by the loop, the total travel route cost=the departure-point-side travel route cost+the passing area travel route cost+the destination-side travel route cost (Step 20).

Specifically, in case of the travel route 1, the total travel route cost=950 is acquired from the departure-point-side travel route cost=300, the passing area travel route cost=250, and the destination-side travel route cost=400.

The CPU 21 determines whether the smallest travel route cost in the RAM 24 is an initial value (Step 21), and in a case in which it is not the initial value (Step 21: N), determines whether the acquired total travel route cost is less than the smallest travel route cost (Step 22).

In a case in which the total travel route cost is less than the smallest travel route cost (Step 22: Y), the CPU 21 updates the smallest travel route cost in the RAM 24 with the total travel route cost acquired at Step 20 (Step 23).

At Step 21, in a case in which the smallest travel route cost is an initial value (Step 21: Y), the CPU 21 changes the smallest travel route cost in the RAM 24 from the initial value to the total travel route cost (Step 23).

In a case in which the initial value to set at the time of initialization at Step 17 is set to a value greater than the possible greatest cost, the total travel route cost of the first travel route 1 acquired at Step 20 will be always less than the initial value. In such a case, Step 21 may be omitted.

For example, in a case in which the total travel route cost of the travel route from "Soya cape" that is the northern end of Hokkaido serving as the departure point to "Sata cape" that is the southern end of Kyushu serving as the destination through the eastern end of "Nosappu cape" without motorways is M, the initial value is set to 2M.

In a case in which the total travel route cost is equal to or greater than the smallest travel route cost (Step 22: N), or after the smallest travel route cost is updated (Step 23), the CPU 21 repeats the process from Step 20 to Step 23 for the amount of the destination-side border point number and the departure-point-side border point number (Step 19-2, Step 18-2).

The aforementioned process is explained with the travel routes 1 to 12 shown in FIG. 5 as an example. At the first loop, the CPU 21 acquires the total travel route cost 950 for the travel route 1 (Step 20) and changes the smallest travel route cost from the initial value to 950 (Step 21: Y→Step 23).

At the next loop, because the total travel route cost 900 for the travel route 2 is less than the smallest travel route cost 950 at the current loop (Step 22: Y), the CPU 21 updates the smallest travel route cost with 900.

In the same manner, because the total travel route cost 880 for the subsequent travel route 3 is less than the smallest travel route cost 900 at the current loop (Step 22: Y), the CPU 21 updates the smallest travel route cost with 880.

Thereafter, because the total travel route cost 1100 for the subsequent travel route 4 is equal to or greater than the smallest travel route cost 880 at the current loop (Step 22: N), the CPU 21 proceeds to the next loop without update.

After the loop for all the destination-side border points with respect to the departure-point-side border point s1 completes, the CPU 21 performs the loops for the respective destination-side border points with respect to the subsequent departure-point-side border points s2, i.e., the travel routes 5 to 8.

The CPU 21 determines the travel route corresponding to the smallest travel route cost stored in the RAM 24 at the time when all the loops complete as the travel route from the acquired departure point S to the destination G through the passing area A (Step 24) and returns to the main routine.

In the example shown in FIG. 5, the travel route 3 corresponding to the smallest travel route cost 880, i.e., the travel route passing through the departure point S, the departure-point-side border point s1, the destination-side border point g3, and the destination G in FIG. 1 is determined.

As described above, according to the navigation device of the present embodiment, as shown in FIG. 1, it is enough to designate, as the passing area, a rough area that the user desires to pass through on the screen or to select a previously defined viewing area. Therefore, the user operation can be reduced.

In addition, the navigation device does not calculate travel routes using all of the border points located on the border line of the designated passing area A as entering points and exiting points of the area. The navigation device limits the route calculation to the border points on the side facing the departure point S and the border points on the side facing the destination G among all of the border points. Thereby, the number of travel route calculation processes decrease and the processing load can be reduced.

The aforementioned embodiment 1 is not limiting. Various improvements and/or modifications may be made without departing from the inventive principles.

For example, in the aforementioned embodiment, a case is explained, in which the total travel route costs at Step 20 are calculated for all of the passing area travel routes from the respective departure-point-side border points to the respective destination-side border points, which are calculated at Step 15.

On the other hand, passing area travel routes whose passing area travel route costs are equal to or less than a predetermined threshold value among all of the passing area travel routes from the respective departure-point-side border points s to the respective destination-side border points g may be excluded from the target for the calculation of total travel route cost.

This is because, when determining a travel route with the smallest total travel route cost, the passing area travel route with a short distance is likely to have a small passing area travel route cost and its total travel route cost will be likely to be the smallest.

For example, in a case in which a rectangular passing area is designated as shown in FIG. 4B, a departure-point-side border point s and a destination-side border point g may exist in the vicinity of a vertex on each side of the vertex.

In such a case, the passing area A that the user has designated will be passed through. However, it may be likely that the user does not desire to pass through the designated passing area A for such short distance.

The passing area travel route, in which the distance (the distance of the passing area travel route) that is traveled in the designated passing area A is equal to or less than a predetermined threshold value, is excluded from the target.

In case of such modification, for example, the predetermined threshold value may be set by the user, or a value set as a default value that is previously determined may be used. Alternatively, a default value may be utilized in a case in which the user does not set the threshold value.

In addition, the navigation device may automatically select a threshold value instead of the user's setting. For example, in a case in which the passing area A is acquired by the user designating two points, the CPU 21 determines the threshold value, for example, a value of L/2, on the basis of a distance L between the designated two points.

In addition, in the aforementioned embodiment, a navigation device installed in a vehicle is exemplified. However, various terminal devices such as a cellular phone, a PDA, a smart phone, a laptop personal computer, etc. that are provided with navigation function may be applied as the navigation device. A pedestrian may utilize these portable devices. Alternatively, these portable devices may be installed and utilized in two wheels.

Further, in the aforementioned embodiment, with respect to a navigation device installed in a vehicle, a case is explained, in which travel route calculation is performed with a departure point S, a passing area A, and a destination G that are inputted on the input device 41.

However, the passing area designation calculation process explained in FIG. 3 may be executed in a server device such as a navigation center.

In such a case, the server device receives a departure point S (a current position acquired in the terminal device in a case in which the current position is the departure point), a passing area A, a destination G from an in-vehicle navigation device or a terminal device provided with the aforementioned navigation function.

Subsequently, a second embodiment and a third embodiment are explained.

In the second and third embodiments, costs for the roads in the passing area A and for the passing area travel routes are corrected such that a route in which an adequate distance is travelled in the passing area A is selected, instead of a passing area travel route in which only a small part of the passing area A is travelled.

The configuration of the navigation device in the second and third embodiments is the same as that of the first embodiment explained in FIG. 2.

Figure 6:
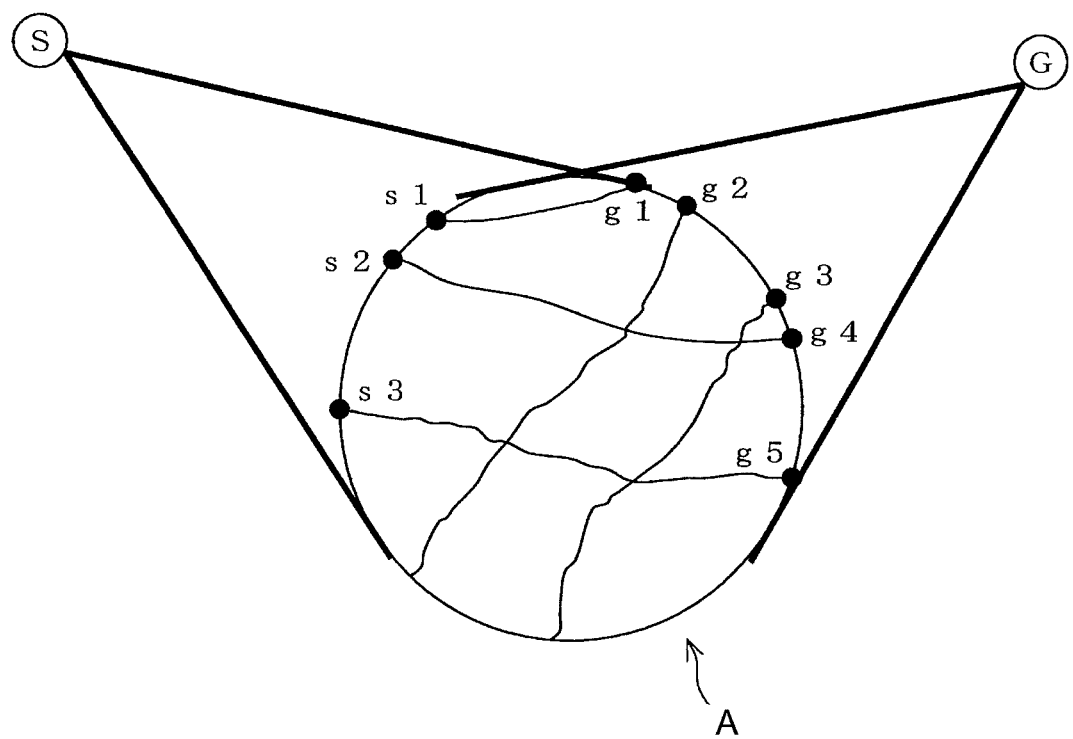
FIG. 6 shows another example of a departure point, a destination, and a passing area A designated by the user.

FIG. 6 shows a departure point, a destination, and a passing area A designated by the user. In the second embodiment and the third embodiment, correction of costs for the roads in the passing area A and for the passing area travel routes shown in FIG. 6 is explained.

The departure-point-side border points s1 to s3 and the destination-side border points g1 to g5 shown in FIG. 6 are determined in the same manner as the first embodiment.

In FIG. 6 and subsequent figures, a case in which a circular area is designated as the passing area A is shown. However, a rectangular area or a previously defined area name may be designated in the same manner as the first embodiment. The designation method is also the same as the first embodiment.

FIG. 7 shows travel route costs of the respective travel routes passing through the passing area A designated in FIG. 6, which are calculated using the method in the first embodiment.

As seen from FIG. 6, the distance of the passing area travel route from the departure-point-side border point s1 to the destination-side border point g1 is considerably shorter than the distances of other passing area travel routes.

Therefore, as shown in FIG. 7, the cost of the passing area travel route No. 1 from the departure-point-side border point s1 to the destination-side border point g1 is 300 while the costs of other passing area travel routes are 600 to 1250. The cost of the passing area travel route No. 1 is quite small. Therefore, the total travel route cost becomes the smallest value of 1600.

As a result, in a case in which an area A as shown in FIG. 6 is designated, the travel route 1 corresponding to the smallest total travel route cost 1600, that is, the travel route of the departure point S, the departure-point-side border point s1, the destination-side border point g1, and the destination G may be determined.

In the second embodiment, in order to increase the possibility that a passing area travel route passing in the vicinity of the center is selected, road costs are corrected so as to be decreased as the distance from the center of the passing area to each road decreases.

FIG. 8 illustrates road numbers of roads serving as correction units that are located in the passing area A, a cost of each road, a distance from the center to each road, and a road cost after correction.

Figures 8A, 8B:
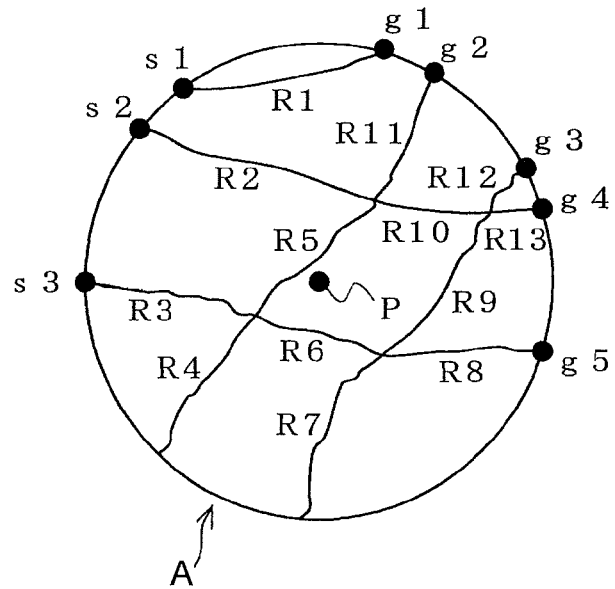
FIG. 8 illustrates road numbers of roads serving as correction units that are located in a passing area A, a cost of each road, a distance from a center to each road, and a road cost after correction according to a second embodiment.

As shown in FIG. 8A, roads serving as correction units include roads between the respective intersections located in the passing area, roads from intersections to the departure-point-side border points s, and roads from intersections to the destination-side border points g. In the example shown in FIG. 8 (FIG. 6), the roads R1 to R13 are target for correction.

The road costs shown in FIG. 8B are road costs using the distances of the roads in the same manner as the costs calculated in the first embodiment. When making corrections by adding traffic signal costs, etc., in a case in which a traffic signal exists in the middle, or at the start point or the end point of roads, the road costs calculated in the same manner are utilized.

In the present embodiment, a shortest distance among distances from a center P to points on the subject road is utilized as the distance from the center P to the road. However, the values as follows may be utilized.
  (a) The average value between the distance from the center P to the start point of the road and the distance from the center P to the end point of the road
  (b) The distance from the center P to the center point of the road
  (c) The distance which is shorter between the distance from the center P to the start point of the road and the distance from the center P to the end point of the road The center P is set to the center point in a case in which the shape of the passing area A is circle, as shown in FIG. 4A, the intersection point of two diagonal lines in a case in which the shape of the passing area A is rectangular, as shown in FIG. 4B, the median point in plane in a case in which the shape of the passing area A is arbitrary, as shown in FIG. 4C, and the intermediate point of focal points in a case in which the shape of the passing area A is an ellipse with the focal points formed by the two points designated as the passing area.

Corrected values K (new road cost after correction) for road costs of the respective roads in the passing area A are calculated according to the following Equation 1.

$$K = k \times (L1/L2) \qquad \text{Equation 1}$$

where k is the road cost before correction, and L1 is the distance from the center P to the road. L2 is a reference distance that is determined based on the size of the passing area A, specifically, a largest value of the distance from the center P to the passing area A. The reference distance L2 is a radius in a case in which the shape of the passing area A is circle, as shown in FIG. 8, and a distance from the center P to a vertex in a case in which the shape of the passing area A is rectangular, as shown in FIG. 4B.

In the example shown in FIG. 8, in a case in which the reference distance L2 (radius) is 500 (m), the corrected costs of the respective roads will be the values shown in FIG. 8B.

For example, in case of a road R1 whose distance from the center P is long, based on the road cost before correction k=300 and the distance L1 from the center P=400, K becomes 300×(400/500)=240.

On the other hand, in case of a road R5 whose distance from the center P is short, based on k=300 and L1=30, K becomes 300×(30/500)=18.

In such a manner, the distances of the road R1 and the road R5 are 300 m; therefore, the road costs are the same, i.e., 300. However, the road cost after correction for the road R1 that is distant from the center P is 240 while the road cost after correction for the road R5 that is near the center P is 18. The road cost of the road that is near the center P becomes a small value. Therefore, the roads that are near the center P are likely to be selected.

FIG. 9 shows comparison in the total travel route costs of the respective travel routes and the rankings (from the smallest) between a case (b) in which the new road costs corrected in accordance with the distances from the center are reflected with respect to the road costs of the respective roads and a case (a) in which the new road costs are not reflected.

As shown in FIG. 9A, in a case in which the correction for the road costs is not performed (in the same manner as the example shown in FIG. 7), the travel route 1 whose total travel route cost is 1600, i.e., the smallest is determined, that is, a route of the departure point S, the departure-point-side border point s1, the destination-side border point g1, and the destination G shown in FIG. 8 is determined.

However, the passing area travel route passing through the departure-point-side border point s1 and the destination-side border point g1 is not preferable because the passing area A is travelled only for a short distance of 300 m.

On the other hand, as shown in FIG. 9B, in a case in which the passing area travel route costs acquired from the road costs corrected based on the distances from the center P are utilized, the total travel route cost with the smallest value becomes the travel route 4 (total travel route cost 1345) that passes through the departure-point-side border point s2 and the destination-side border point g4, and the travel route 4 is determined.

The total travel route cost of the travel route 1, which is the smallest in case of no correction, becomes 1540 and the ranking becomes eighth when the corrected new road costs are reflected.

According to the second embodiment, with respect to the respective roads in the passing area A, a smaller coefficient is multiplied for correction as the distance from the center P decreases. Thereby, the passing area travel routes passing near the center P are likely to be selected compared to the passing area travel route passing around the edge of the passing area A. Therefore, it is possible to select a travel route that passes through the passing area A set by the user for an adequate distance.

Subsequently, the third embodiment is explained.

In the third embodiment, a smaller correction coefficient γ is multiplied for correction as the travel distance of the passing area travel route from the departure-point-side border point s to the destination-side border point g increases. Thereby, a passing area travel route whose travel distance in the passing area A is an adequate distance is likely to be selected.

Specifically, in a case in which the total travel distance from the departure point S to the destination G is L3, the travel distance of the passing area travel route is L4, and the distance other than the passing area travel route is L5, the correction coefficient γ is set to L5/L3.

L5 is equal to L3−L4. Therefore, the correction coefficient γ=L5/L3=(L3−L4)/L3 is acquired. Therefore, the correction coefficient γ becomes a smaller value as the travel distance L4 of the passing area travel route increases.

Consequently, in accordance with the following Equation 2, a passing area travel route cost after correction C2 is acquired by multiplying a cost of the passing area travel route C1 (passing area travel route cost) by the coefficient L5/L3.

$$C2 = C1 \times (L3 - L4)/L3 \qquad \text{Equation 2}$$

FIG. 10 shows the passing area travel route costs (new costs) after correcting, according to the Equation 2, the passing area travel route costs of the respective passing area travel routes passing through the passing area A according to the third embodiment.

In FIG. 10, the calculation is performed with respect to the travel routes in the passing area A shown in FIG. 6 and FIG. 8.

In FIG. 10, in case of the passing area travel route 1, for example, the passing area travel route cost C1 is equal to 300, the distance of the passing area travel route is equal to 300, and the total distance is equal to 1600.

According to Equation 2, a passing area travel route cost after correction C2 (new cost) becomes as follows.

$$C2=300\times(1600-300)/1600=244$$

In addition, in case of the passing area travel route 5 whose passing area travel route cost before correction is the largest, the passing area travel route cost C1 is equal to 1250, the distance of the passing area travel route is equal to 1250, and the total distance is equal to 2450. Therefore, according to Equation 2, the passing area travel route cost after correction C2 (new cost) becomes as follows.

$$C2=1250\times(2450-1250)/2450=613$$

FIG. 11 shows comparison in the travel route costs of the respective travel routes and the rankings (from the smallest) between a case (b) in which the respective passing area travel route costs after correction C2 (new costs) according to Equation 2 are reflected and a case (a) in which the new costs are not reflected.

As shown in FIG. 11A, in a case in which the correction for the road costs is not performed (in the same manner as the example shown in FIG. 7 and FIG. 9A), the travel route 1 whose total travel route cost is 1600, i.e., the smallest is determined, that is, a route of the departure point S, the departure-point-side border point s1, the destination-side border point g1, and the destination G is determined.

On the other hand, as shown in FIG. 11B, in a case in which the passing area travel route costs corrected using the correction coefficients γ as shown in FIG. 10A are utilized, the total travel route cost with the smallest value is the travel route 4 (total travel route cost 1535) passing through the departure-point-side border point s2 and the destination-side border point g4, and the travel route 4 is determined.

The total travel route cost of the travel route 1, which is the smallest in case of no correction, becomes 1544 and the ranking becomes second by reflecting the corrected new road costs.

According to the third embodiment, with respect to the passing area travel route cost, a smaller coefficient γ is multiplied for correction as the travel distance of the passing area travel route increases. By using the passing area travel route costs after correction acquired with the correction coefficient γ, routes in which the travel distance in the passing area is short or long are less likely to be selected. This is because the correction coefficient becomes large in a case in which the travel route of the passing area is short and the correction coefficient becomes small but the total travel distance becomes long in a case in which the travel route in the passing area is long.

According to the third embodiment; therefore, a passing area travel route with an adequate distance is likely to be selected, thereby a travel route in which the passing area A set by the user is traveled for an adequate distance can be selected.

The passing area designation calculation processes according to the aforementioned second embodiment and third embodiment are performed in the same manner as the first embodiment excluding Step 20 that is the process explained in FIG. 3.

At Step 20, the CPU 21 calculates, with respect to the travel route selected in each loop, total travel route cost=departure-point-side travel route cost+passing area travel route cost after correction+destination side travel route cost.

That is, in case of the second embodiment, the total travel route cost is calculated using the passing area travel route costs after correction using the road costs K that are corrected according to Equation 1 as shown in FIG. 8B (refer to FIG. 9B).

In case of the third embodiment, the total travel route costs are calculated using the passing area travel route costs C2 corrected according to Equation 2 (refer to FIG. 11B).

In the aforementioned second embodiment and third embodiment, a case is explained, in which all passing area travel routes from the respective departure-point-side border points s to the respective destination-side border points g, which are calculated at Step 15 in FIG. 3, are set as the calculation target for the total travel route costs.

The various modifications explained in the first embodiment may be applied to the second embodiment and the third embodiment.

For example, the passing area travel routes whose passing area travel route costs are equal to or less than a predetermined threshold value among all of the passing area travel routes from the respective departure-point-side border points s to the respective destination-side border points g may be excluded from the calculation target for total travel route cost. With respect to the passing area travel routes whose passing area travel route costs exceed the threshold value, the passing area travel route costs may be corrected and the total travel route costs may be calculated to determine the smallest travel route cost.

The invention claimed is:
1. A navigation device, comprising:
a memory storing a program; and
a CPU that, when executing the program:
  acquires a departure point and a destination;
  accepts a designation of a passing area;
  determines a plurality of departure-point-side border points on a departure point side and a plurality of destination-side border points on a destination side in the designated passing area by:
    defining first two tangent lines extending from the acquired departure point toward the passing area and determining the departure-point-side border points on a border of the passing area on the departure point side, which is sandwiched in between the first two tangent lines; and
    defining second two tangent lines extending from the acquired destination toward the passing area and determining the destination-side border points on a border of the passing area on the destination side, which is sandwiched in between the second two tangent lines; and
  calculates a travel route from the departure point to the destination through the passing area by:
    calculating departure-point-side travel routes from the departure point to each departure-point-side border point;
    calculating passing area travel routes from each departure-point-side border point to each destination-side border point;
    calculating destination-side travel routes from each destination-side border point to the destination;
    obtaining each departure point travel route cost from the departure point to each departure-point-side border point;
    obtaining each passing area travel route cost from each departure-point-side border point to each destination-side border point by correcting a road cost of each road in the passing area by multiply- ing a smaller coefficient as a distance from a center of the designated passing area to the road decreases;

obtaining each destination-side travel route cost from each destination-side border point to the destination; and setting, as the travel route, a combination in which a total cost becomes the smallest among combinations of one of the calculated departure point travel routes, one of the calculated passing area travel routes, and one of the calculated destination-side travel routes.

2. The navigation device according to claim 1, wherein the distance from the center to the road is any one of:

a shortest distance to the road;

an average value between a distance to a start point and a distance to an end point of the road;

a distance to a center point of the road;

the distance to the start point or the distance to the end point of the road whichever is shorter; and a shortest distance with respect to respective links forming the road.

3. The navigation device according to claim 1, wherein, when executing the program, the CPU:

corrects a passing area travel route cost of each passing area travel route by multiplying a coefficient that decreases as a travel distance of the passing area travel route from the departure-point-side border point to the destination-side border point increases; and obtains each passing area travel route cost using the corrected passing area travel route cost.

4. The navigation device according to claim 3, wherein, when executing the program, the CPU:

corrects each passing area travel route cost by multiplying a smaller coefficient as a value of the travel distance of the passing area travel route in relation to a total travel distance of the travel route from the departure point to the destination through the passing area increases.

5. The navigation device according to claim 1, wherein, when executing the program, the CPU:

acquires a threshold value for a distance or a time for traveling the passing area; and excludes a passing area travel route whose travel distance or travel time is equal to or less than the threshold value among each passing area travel route from each departure-point-side border point to each destination-side border point.

6. A non-transitory computer-readable storage medium storing a computer-executable navigation program, the program comprising instructions to implement:

a point acquisition function that acquires a departure point and a destination;

a passing area designation function that accepts a designation of a passing area;

a determination function that determines a plurality of departure-point-side border points on a departure point side and a plurality of destination-side border points on a destination side in the designated passing area by:

defining first two tangent lines extending from the acquired departure point toward the passing area and determining the departure-point-side border points on a border of the passing area on the departure point side, which is sandwiched in between the first two tangent lines; and defining second two tangent lines extending from the acquired destination toward the passing area and determining the destination-side border points on a border of the passing area on the destination side, which is sandwiched in between the second two tangent lines; and a route calculation function that calculates a travel route from the departure point to the destination through the passing area by:

calculating departure-point-side travel routes from the departure point to each departure-point-side border point;

calculating passing area travel routes from each departure-point-side border point to each destination-side border point;

calculating destination-side travel routes from each destination-side border point to the destination;

obtaining each departure point travel route cost from the departure point to each departure-point-side border point;

obtaining each passing area travel route cost from each departure-point-side border point to each destination-side border point by correcting a road cost of each road in the passing area by multiplying a smaller coefficient as a distance from a center of the designated passing area to the road decreases;

obtaining each destination-side travel route cost from each destination-side border point to the destination; and setting, as the travel route, a combination in which a total cost becomes the smallest among combinations of one of the calculated departure point travel routes, one of the calculated passing area travel routes, and one of the calculated destination-side travel routes.

* * * * *